W. S. COOK.
WATER ELEVATOR.
APPLICATION FILED MAY 24, 1912. RENEWED MAY 20, 1914.
1,123,101.
Patented Dec. 29, 1914.
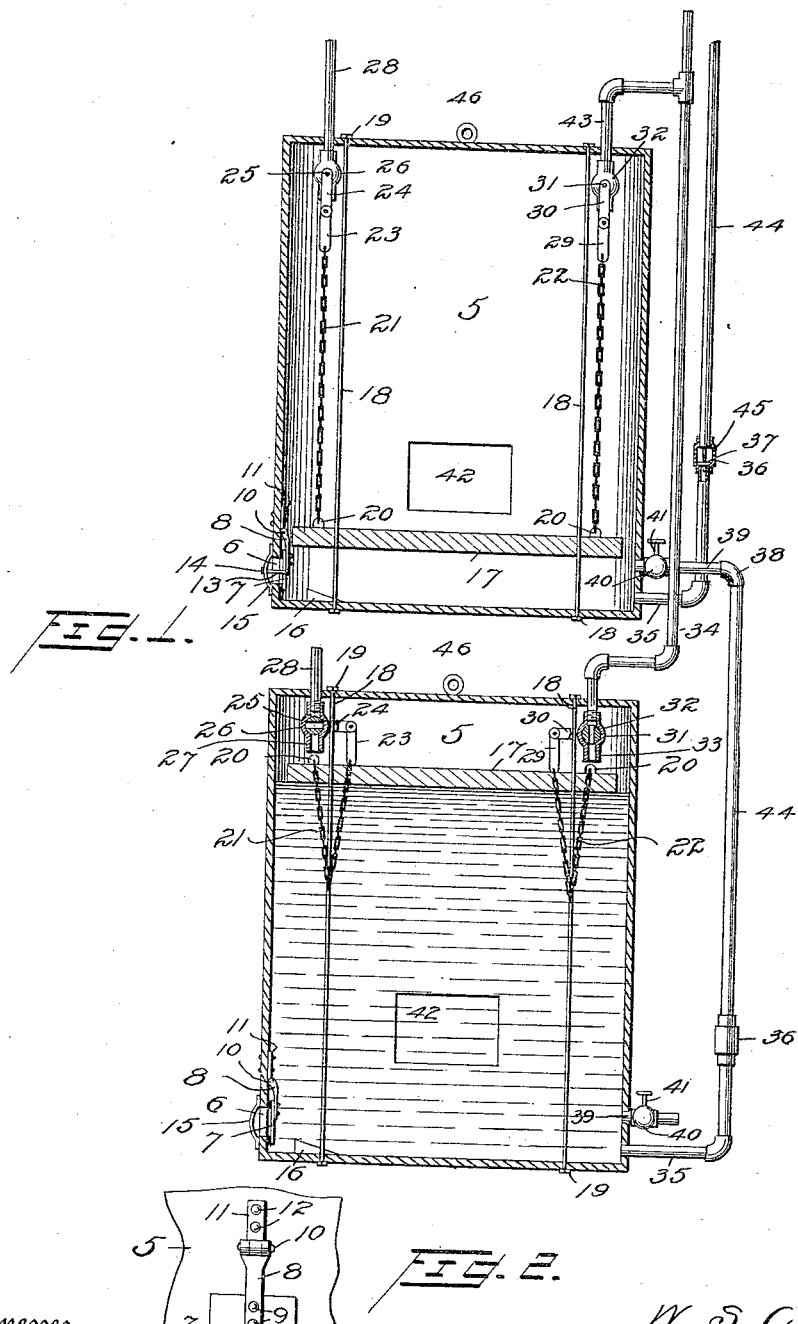
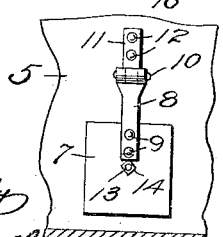
Witnesses
Inventor
W. S. Cook
By Victor J. Evans
Attorney

UNITED STATES PATENT OFFICE.

WILLIAM S. COOK, OF ATLANTIC CITY, WYOMING.

WATER-ELEVATOR.

1,123,101.     Specification of Letters Patent.     Patented Dec. 29, 1914.

Application filed May 24, 1912, Serial No. 699,573. Renewed May 20, 1914. Serial No. 839,895.

*To all whom it may concern:*

Be it known that I, WILLIAM S. COOK, a citizen of the United States, residing at Atlantic City, in the county of Fremont and State of Wyoming, have invented new and useful Improvements in Water - Elevators, of which the following is a specification.

The general object of this invention is the provision of an automatic system used for elevating water from mines, wells and other bodies of water, for purposes of irrigation and the like, a construction being employed whereby compressed air is used for forcing the water to the desired elevation.

In carrying out the objects of the invention generally stated above, it will be understood, of course, that the essential features thereof are susceptible to changes in details and structural arrangements, one preferred and practical embodiment being shown in the accompanying drawing, wherein—

Figure 1 is a vertical sectional view of the system constructed in accordance with the invention. Fig. 2 is a fragmentary view of one of the tanks used in connection with the invention, showing the water inlet valve thereof in elevation.

Referring more particularly to the accompanying drawing in which like reference characters designate similar parts, it will be seen that the invention comprises a plurality of superimposed tanks 5 which are connected in a manner to be hereinafter more fully described, it being understood, of course, that the number of these tanks may be varied according to the height that the water is to be elevated. For purposes of illustration there has been shown only two tanks, the bottom one of which is first adapted to be filled with water which is then forced into the tank above in a manner to be described.

Each of the tanks 5 is provided in its vertical wall adjacent the bottom thereof with a water inlet opening 6 which is adapted to be closed by a gate valve 7 which is connected to a hinged arm 8 by means of suitable fasteners 9, said arm 8 being pivoted at 10 to a plate 11 which is secured to the inner wall of the tank 5 by means of the rivets 12. The gate valve 7 may be locked in a closing position by means of an outwardly extending stud 13 which is suitably secured at one end of the valve 7 and which has its free end threaded and adapted to receive a fastening nut 14 which when threaded upon the stud 13 engages a spider 15 which bridges the opening 6 and which is secured to the side of the tank in any suitable manner. It is to be understood that when the system is in use all of the gate valves are closed with the exception of the one in the lowermost tank thus preventing the escape of the water from the other tanks.

When the lowermost tank has been inserted into the water, the pressure of the latter will cause the gate valve 7 to move inwardly, the inward movement thereof being limited by a stop 16 secured to the bottom of the tank, thus permitting the water to flow into the tank and raise a float valve 17 which is slidably mounted upon a pair of guide rods 18 which are arranged vertically within the tank and secured in position by means of the nuts 19. Secured to the upper surface of the float valve 17 as indicated at 20 are a pair of chains 21 and 22. The other end of the chain 21 has connected thereto one end of a lever 23, the other end of said lever being pivotally connected to a lever 24. The rotary valve 25 is connected to the other end of the lever 24 and is mounted in a suitable valve casing 26 which has an extension 27 depending therefrom and to which is connected at its upper end an air escape or vent pipe 28 which projects through the top of the tank 5 and which communicates with the outer atmosphere. It is to be understood that the valve 25 is opened when the float 17 is in its lowered position. Upon the raising of the float 17 the same will come in contact with the lever 23 and impart motion thereto whereby the lever 24 will be actuated thus rotating the valve 25 and closing the vent pipe 28 and thus prevent any escape of air through said pipe. Simultaneously with the contact of the float 17 with the lever 23, said float will also come into contact with a lever 29 which is pivotally connected to the similar lever 30, the last named lever being connected to a rotary valve 31, similar in construction to the valve 25, said valve 31 being mounted in a casing 32 having the extension 33 depending therefrom. Connected to the upper end of the casing 32 is a compressed air pipe 34 which is connected at its upper end to a suitable compressed air pump (not shown) and may be preferably connected to the system illustrated in Patent #1,006,912. It will be understood that when the float 17 is in its lowered position the valve 31 is closed thus preventing the admission of compresesd air into the tank. But upon contact of the float 17 with the lever 29, said valve 31 will be rotated and opened and thus admit compressed air into the tank. The admission of compressed air into the tank will tend to force the float 17 downwardly and also have a corresponding action upon the water into the tank. This downward pressure will close the gate valve 7 and thus prevent the escape of the water through the opening 6. The water is forced from the tank through a discharge pipe 35 which is mounted in said tank adjacent the bottom thereof, said discharge pipe being provided with a casing 36 in which is mounted a check valve 37, said valve being adapted to close communication with the tank when the float is in its lowered position, but which is adapted to raise upon the pressure of the air admitted to the pipe 34.

The pressure of the air admitted through the pipe 34 is sufficient to elevate the water through the discharge pipe 35 which is connected at its end to a coupling 38, said coupling having connected thereto a nozzle 39 which projects into the tank above the lowermost tank adjacent the bottom thereof. The nozzle 39 is provided with a valve seat 40 therein which is adapted to be closed by a valve 41 when it is desired to make repairs or cleanse the tanks, access being had thereto through the manholes 42 which may be constructed in any suitable manner. When the float 17 in the lowermost tank is in its raised position, the float in the tank above is in its lowered position so that upon admission of the water into the upper tank, the float therein will be caused to raise and actuate the air inlet and outlet valves therein in a manner identical with that which is illustrated and described in connection with the lowermost tank. The compressed air inlet valve in the upper tank is connected to a branch pipe 43 which communicates with the main compressed air pipe 34 thus admitting compressed air into the upper tank whereby the water therein will be discharged through the discharge pipe 44 which is similar in construction to the discharge pipe 35 and which also has a check valve 45 mounted therein.

When the float 17 has reached its lowermost position by reason of the air pressure thereon, the chains 21 and 22 will be tightened and will actuate the levers to which they are connected thus opening the valve 25 of the air vent pipe and closing the valve 31 of the compressed air pipe. The opening of the valve 25 will permit the compressed air in the tank to escape therefrom through the exhaust pipe 28 and will permit the gate valve 7 to be opened by the pressure of the water from the outside and thus allow the tank to be again filled preparatory to discharging the water therefrom into the tank above. When it is desired to remove the tanks, a suitable lifting device may be connected to the eye-bolts 46 which are carried by the top of the tanks 5.

From the foregoing description taken in connection with the drawing, it will be seen that the invention contemplates providing a system for pumping the water which is automatically operated through the medium of compressed air and which is simple in construction and effective in operation.

What is claimed is:—

1. A system of the class described comprising a plurality of superimposed tanks in communication with each other adjacent their lower end, floats arranged in the tank, means for guiding the floats in movement in the tanks, air inlet and outlet pipes opening into the tanks above the float, valves carried by said pipes within the tanks, a valve operating member connected to each valve and positioned to be engaged and operated by the float in the upward movement of the latter immediately preceding the float reaching its uppermost position, and a flexible connection intermediate said member and the float whereby said member is reversely operated by the float immediately preceding the arrangement of the float in its lowermost position, the float intermediate its lowermost and uppermost position moving free of effect upon the valves.

2. A system of the class described comprising a plurality of superimposed tanks in communication with each other adjacent their lower end, floats arranged in the tank, means for guiding the floats in movement in the tanks, air inlet and outlet pipes opening into the tanks above the float, valves carried by said pipes within the tanks, a valve operating member connected to each valve and positioned to be engaged and operated by the float in the upward movement of the latter immediately preceding the float reaching its uppermost position, a flexible connection intermediate said member and the float whereby said member is reversely operated by the float immediately preceding the arrangement of the float in its lowermost position, the float intermediate its lowermost and uppermost position moving free of effect upon the valves, said inlet and outlet valves being set for relatively reverse operation in any particular float operated actuation.

In testimony whereof I affix my signature in presence of two witnesses.

WILLIAM S. COOK.

Witnesses:
Wm. B. Gratrix,
Ed. Walsh.

Copies of this patent may be obtained for five cents each, by addressing the "Commissioner of Patents, Washington, D. C."